(12) United States Patent
Kubo et al.

(10) Patent No.: US 10,397,447 B2
(45) Date of Patent: Aug. 27, 2019

(54) IMAGE PROCESSING APPARATUS FOR MEASURING COLORIMETRIC VALUES OF A COLOR IMAGE HAVING GLITTERING CHARACTERISTICS FROM A PLURALITY OF DIRECTIONS

(71) Applicant: FUJI XEROX CO., LTD., Tokyo (JP)

(72) Inventors: Masahiko Kubo, Kanagawa (JP); Kaoru Yamauchi, Kanagawa (JP); Ayako Watanabe, Kanagawa (JP); Yosuke Tashiro, Kanagawa (JP); Kaori Iwaki, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/915,159

(22) Filed: Mar. 8, 2018

(65) Prior Publication Data

US 2019/0075221 A1 Mar. 7, 2019

(30) Foreign Application Priority Data

Sep. 1, 2017 (JP) ................................ 2017-168658

(51) Int. Cl.
*H04N 1/00* (2006.01)
*H04N 1/60* (2006.01)
(Continued)

(52) U.S. Cl.
CPC ......... *H04N 1/6086* (2013.01); *G06F 3/1208* (2013.01); *H04N 1/00023* (2013.01);
(Continued)

(58) Field of Classification Search
CPC .. H04N 1/6086; H04N 1/6044; H04N 1/6038; H04N 1/00034; H04N 1/00023; G06F 3/1208
See application file for complete search history.

(56) References Cited

U.S. PATENT DOCUMENTS 8,711,432 B2    4/2014  Ito
2011/0043560 A1*  2/2011  Tanoue ................. B41J 2/2114
                                                                347/12
(Continued)

FOREIGN PATENT DOCUMENTS

JP        5909887 B2    4/2016
JP        5920580 B2    5/2016

*Primary Examiner* — Benjamin O Dulaney
(74) *Attorney, Agent, or Firm* — Sughrue Mion, PLLC

(57) ABSTRACT

An image processing apparatus includes a storage unit in which plural colorimetric values obtained by measuring a target-color image having a glittering characteristic from plural directions are stored for each target color; a color information receiving unit that receives color information for specifying a target color to be printed; a display controller that reads out plural colorimetric values stored corresponding to the target color of the color information from the storage unit and causes the plural colorimetric values to be displayed on a display; a change receiving unit that receives a change of the plural colorimetric values displayed on the display by the display controller; and a converter that converts the plural colorimetric values reflecting the change into color values including a value indicative of an amount of a glittering color material and a value indicative of an amount of a color material other than the glittering color material.

16 Claims, 19 Drawing Sheets

(51) Int. Cl.
*H04N 1/23* (2006.01)
*G06F 3/12* (2006.01)
(52) U.S. Cl.
CPC ..... *H04N 1/00034* (2013.01); *H04N 1/00408* (2013.01); *H04N 1/2346* (2013.01)

(56) References Cited

U.S. PATENT DOCUMENTS

| | | | |
|---|---|---|---|
| 2011/0063699 A1* | 3/2011 | Ishizuka | H04N 1/6016 |
| | | | 358/530 |
| 2012/0320393 A1* | 12/2012 | Ito | H04N 1/54 |
| | | | 358/1.9 |
| 2013/0188186 A1* | 7/2013 | Okumura | G01J 3/46 |
| | | | 356/402 |
| 2014/0268193 A1* | 9/2014 | Choulet | G06K 15/027 |
| | | | 358/1.9 |
| 2019/0080479 A1* | 3/2019 | Totsuka | B41J 2/01 |

* cited by examiner

FIG. 6

| SPOT COLOR NAME | L*a*b*(15°) | | | L*a*b*(45°) | | | L*a*b*(110°) | | |
|---|---|---|---|---|---|---|---|---|---|
| | L*(15°) | a*(15°) | b*(15°) | L*(45°) | a*(45°) | b*(45°) | L*(110°) | a*(110°) | b*(110°) |
| CUSTOM COLOR 1 | 100 | 10 | 40 | 40 | 2 | 25 | 20 | 0 | 12 |
| CUSTOM COLOR 2 | 145 | 0 | −2 | 55 | −1 | −1 | 30 | −1 | −1 |
| CUSTOM COLOR 3 | 130 | 1 | 1 | 53 | 0 | 2 | 25 | 0 | 3 |
| CUSTOM COLOR 4 | 125 | 3 | 6 | 50 | 2 | 6 | 25 | 1 | 5 |
| CUSTOM COLOR 5 | 120 | 5 | 10 | 48 | 3 | 9 | 24 | 2 | 6 |

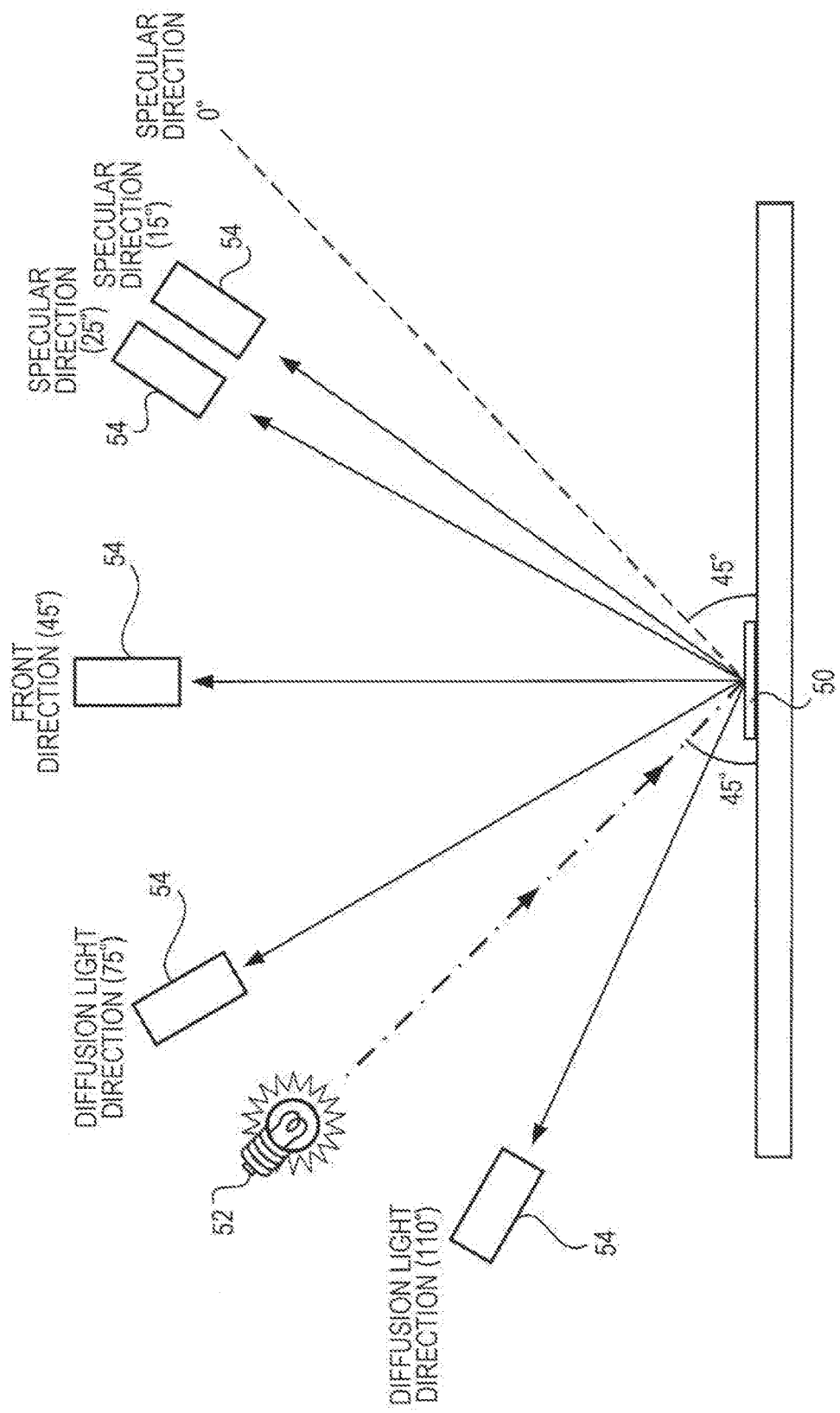

IMAGE PROCESSING APPARATUS FOR MEASURING COLORIMETRIC VALUES OF A COLOR IMAGE HAVING GLITTERING CHARACTERISTICS FROM A PLURALITY OF DIRECTIONS

CROSS-REFERENCE TO RELATED APPLICATIONS

This application is based on and claims priority under 35 USC 119 from Japanese Patent Application No. 2017-168658 filed Sep. 1, 2017.

BACKGROUND

Technical Field

The present invention relates to an image processing apparatus, an image forming apparatus, and a non-transitory computer readable medium.

SUMMARY

According to an aspect of the invention, there is provided an image processing apparatus including a storage unit in which plural colorimetric values obtained by measuring a target-color image having a glittering characteristic from plural directions are stored for each target color; a color information receiving unit that receives color information for specifying a target color to be printed; a display controller that performs a control operation for reading out plural colorimetric values stored corresponding to the target color of the color information received by the color information receiving unit from the storage unit and causing the plural colorimetric values to be displayed on a display; a change receiving unit that receives a change of the plural colorimetric values displayed on the display by the display controller; and a converter that converts the plural colorimetric values reflecting the change received by the change receiving unit into color values including a value indicative of an amount of a glittering color material and a value indicative of an amount of a color material other than the glittering color material.

BRIEF DESCRIPTION OF THE DRAWINGS

An exemplary embodiment of the present invention will be described in detail based on the following figures, wherein:

FIG. 6 illustrates an example of colorimetric values stored in a colorimetric value storage unit;

FIG. 19 is a view for explaining a case where a color is measured from colorimetric directions of five angles.

DETAILED DESCRIPTION

Next, an exemplary embodiment of the present invention is described in detail below with reference to the drawings.

Figure 1:
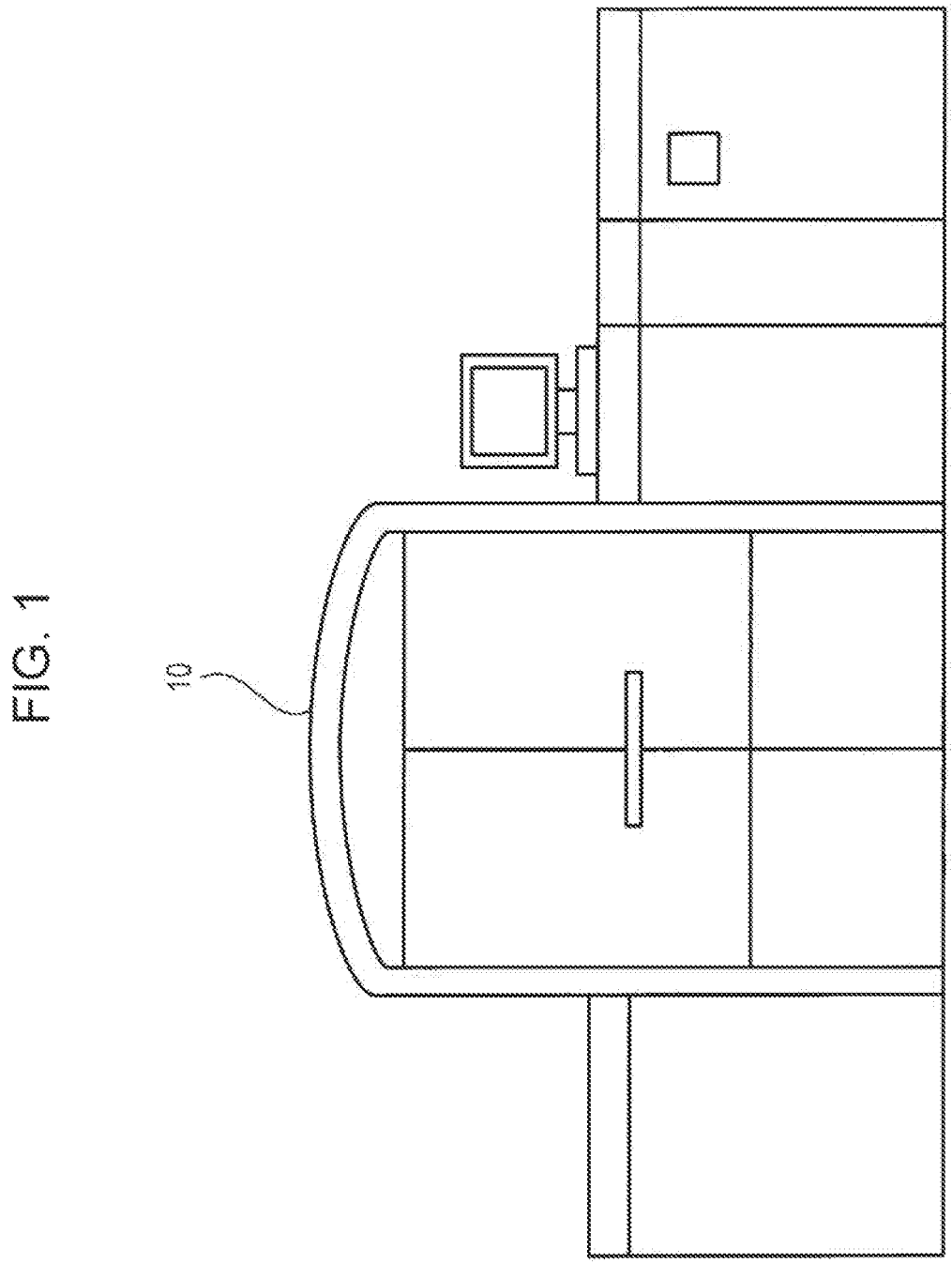
FIG. 1 illustrates an external configuration of an image forming apparatus according to an exemplary embodiment of the present invention.

FIG. 1 illustrates an external configuration of an image forming apparatus 10 according to an exemplary embodiment of the present invention.

As illustrated in FIG. 1, the image forming apparatus 10 according to the present exemplary embodiment is a production printer for business use and has a function for printing of high image quality and high speed.

Figure 2:
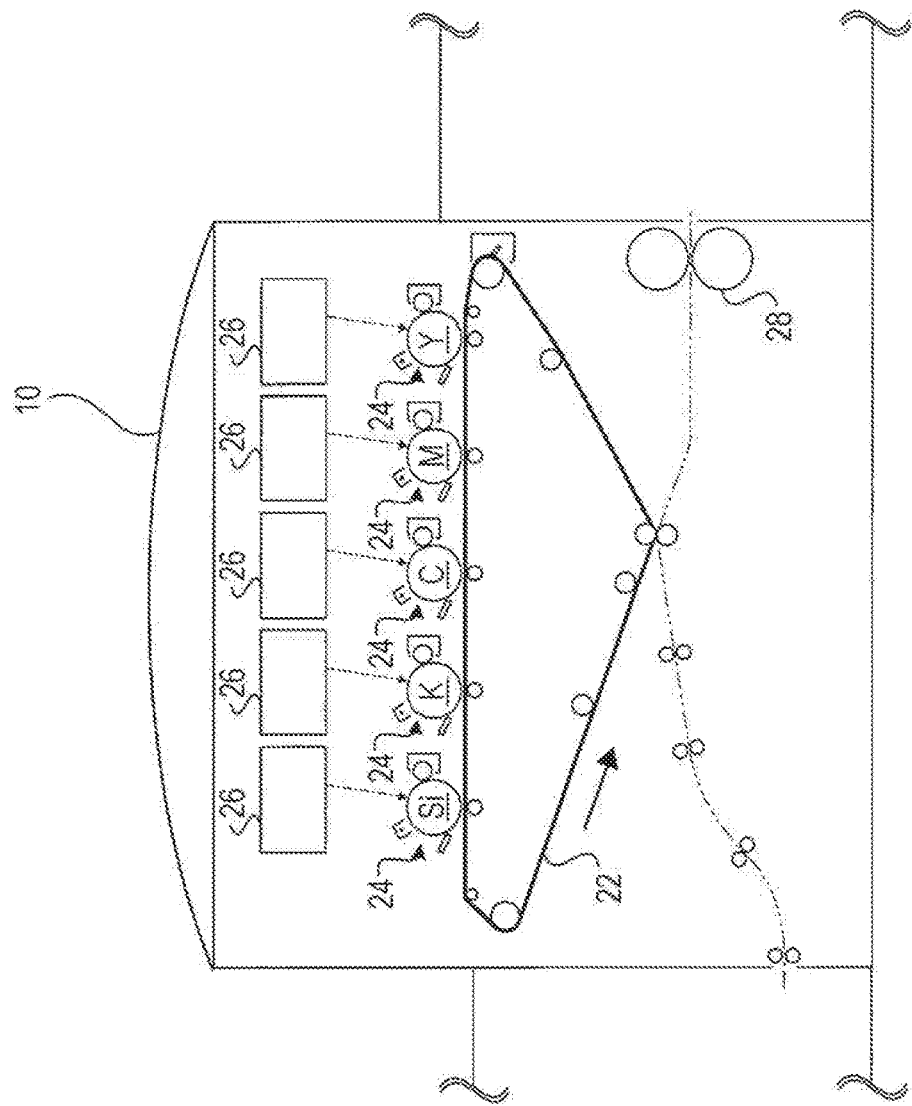
FIG. 2 is a view for explaining an internal structure of the image forming apparatus.

An internal structure of the image forming apparatus 10 is described below with reference to FIG. 2. As illustrated in FIG. 2, the image forming apparatus 10 includes five image forming units 24. The five image forming units 24 are configured to form images by using yellow (Y), magenta (M), cyan (C), black (K), and spot-color toner.

Examples of the spot-color toner include silver toner (Si), gold toner (G), transparent toner, and white toner, and any one of these kinds of spot-color toner can be selected and used. FIG. 2 illustrates a case where silver toner (Si) among these kinds of spot-color toner is selected and used.

Although a case where an image is formed by using metallic (metallic luster color) toner such as silver toner or gold toner and where toner amounts (color material amounts) of the respective colors CMYKSi are determined is described in the present exemplary embodiment, the following describes a case where an image is formed by using silver toner.

A toner amount as used herein refers to an amount (e.g., toner weight (g/m$^2$)) of toner used per unit area on a recording medium. In the following description, a toner amount is expressed as a percentage (toner coverage) of an amount of toner of each color used for printing in a case where a maximum value of an amount of toner of each color used per unit area (e.g. per pixel) is 100%.

Each of the image forming units 24 includes a photoconductor drum, a charging device that uniformly charges a surface of the photoconductor drum, a developing device that develops an electrostatic latent image formed on the photoconductor drum, and the like. On the photoconductor drum of each of the image forming units 24, an electrostatic latent image is formed by laser light emitted from an optical scanning device 26 and is developed by toner of a corresponding color, and thus an image is formed.

Then, images of the respective colors formed in the image forming units 24 are transferred onto an intermediate transfer belt 22 and are then further transferred onto a printing sheet that has been transported. Then, the toner images transferred onto the printing sheet are fixed on the printing sheet by heat and pressure by a fixing unit 28.

Figure 3:
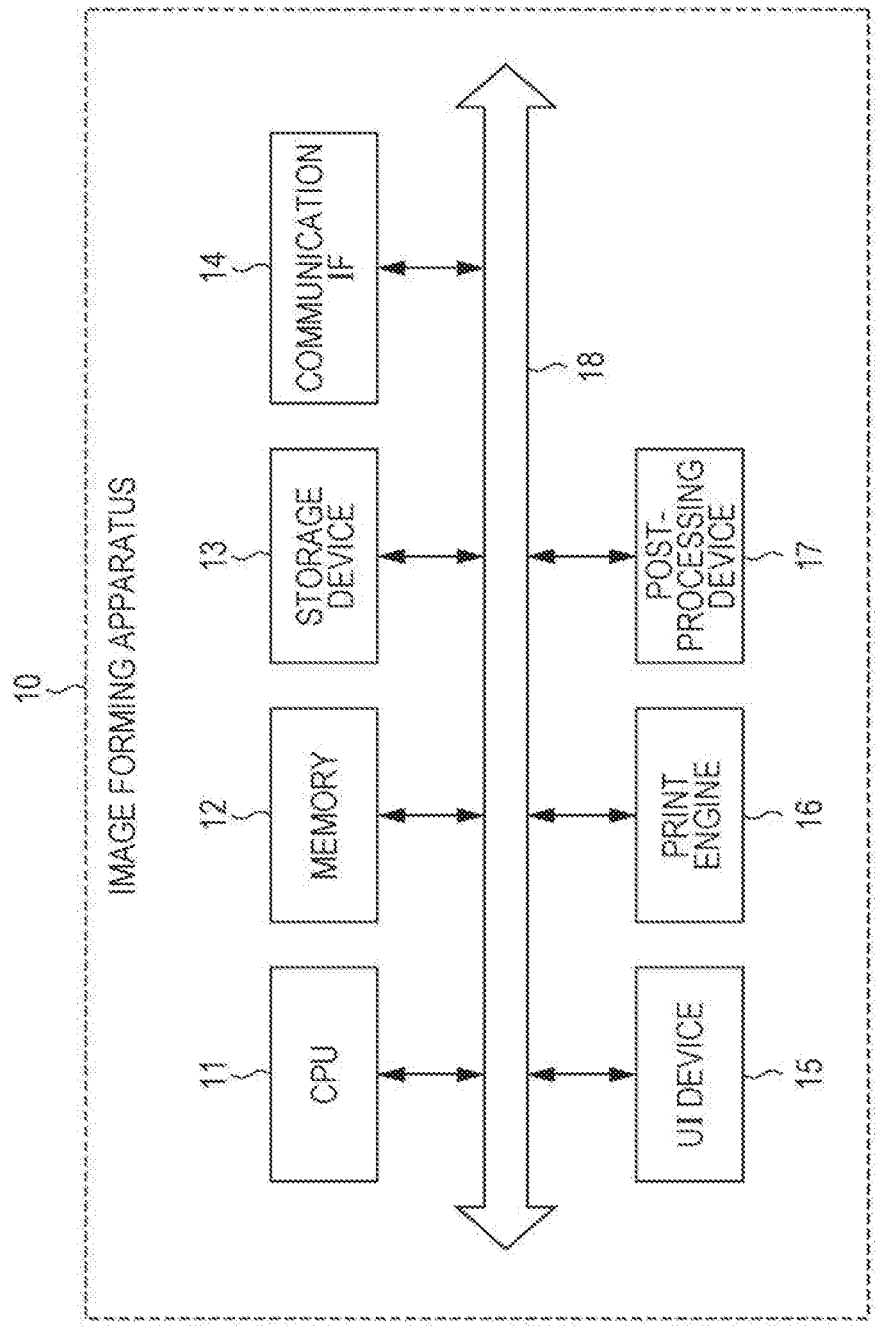
FIG. 3 is a block diagram illustrating a hardware configuration of the image forming apparatus according to the exemplary embodiment of the present invention.

Next, a hardware configuration of the image forming apparatus 10 according to the present exemplary embodiment is illustrated in FIG. 3.

As illustrated in FIG. 3, the image forming apparatus 10 includes a central processing unit (CPU) 11, a memory 12, a storage device 13 such as a hard disk drive (HDD), a communication interface (IF) 14 that transmits and receives data to and from an external device or the like over a network 30, a user interface (UI) device 15 including a touch panel or a liquid crystal display and a keyboard, a print engine 16, and a post-processing device 17. These constituent elements are connected to one another through a control bus 18.

The print engine 16 prints an image on a recording medium such as a printing sheet through steps such as charging, exposure, development, transfer, and fixation. The post-processing device 17 performs various kinds of post-processing such as staple processing, punching processing, and folding processing on a sheet of paper that has been subjected to the printing processing by the print engine 16.

The CPU 11 controls an operation of the image forming apparatus 10 by performing predetermined processing based on a control program stored in the memory 12 or the storage device 13. In the present exemplary embodiment, the CPU 11 reads out and executes a control program stored in the memory 12 or the storage device 13. However, the program stored in a recording medium such as a CD-ROM may be offered to the CPU 11.

Figure 4:
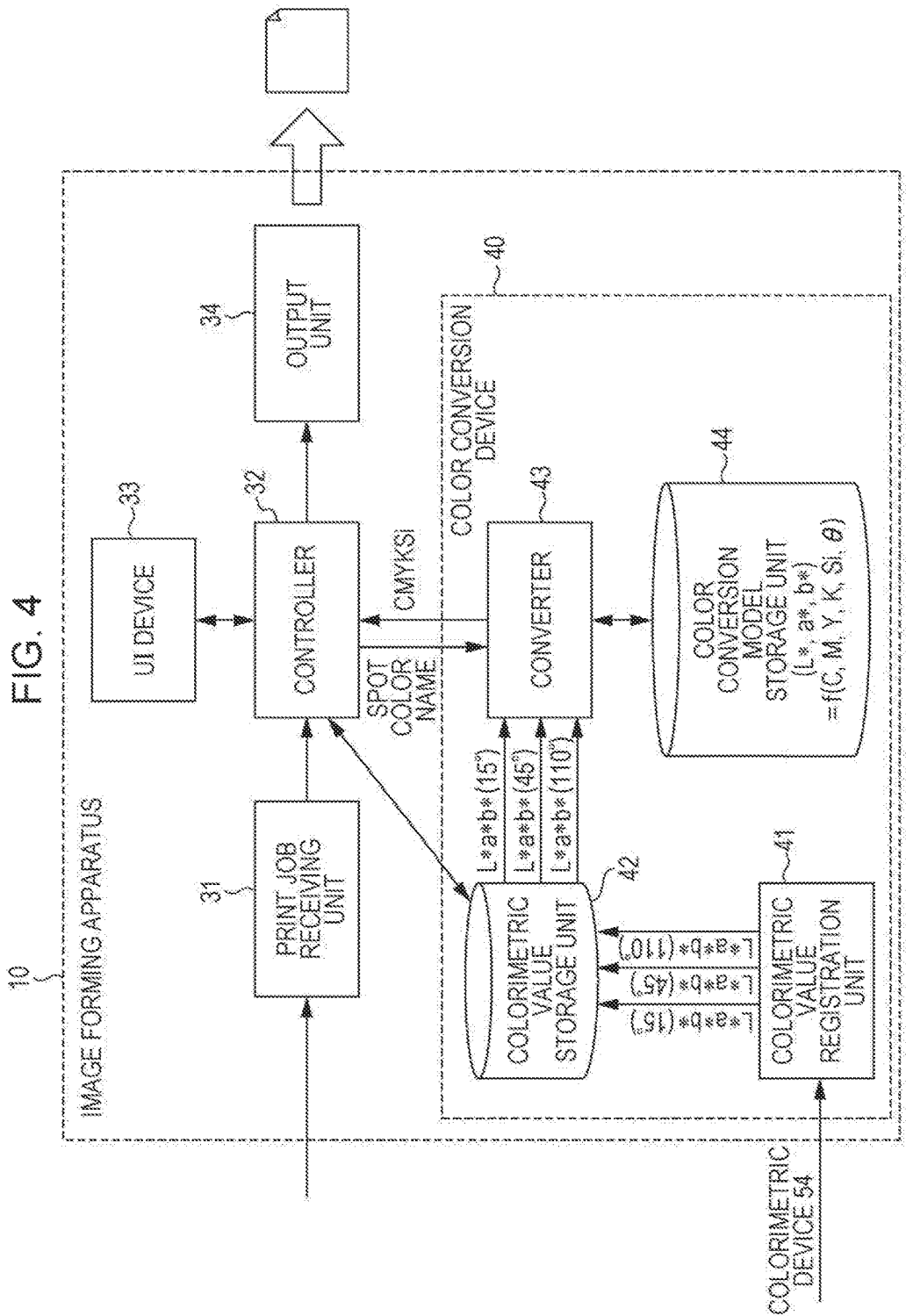
FIG. 4 is a block diagram illustrating a functional configuration of the image forming apparatus according to the exemplary embodiment of the present invention.

FIG. 4 is a block diagram illustrating a functional configuration of the image forming apparatus 10 achieved by execution of the control program.

As illustrated in FIG. 4, the image forming apparatus 10 according to the present exemplary embodiment includes a print job receiving unit 31, a controller 32, a UI device 33, an output unit 34, and a color conversion device 40. The color conversion device 40 includes a colorimetric value registration unit 41, a colorimetric value storage unit 42, a converter 43, and a color conversion model (printer model) storage unit 44. The color conversion device 40 functions as an image processing apparatus that performs not only color conversion processing for determining toner amounts, but also other image processing such as generation of a color conversion model.

The print job receiving unit 31 receives a print instruction from an external terminal apparatus or the like over a network.

The controller 32 performs print processing by controlling the output unit 34 on the basis of a print job received by the print job receiving unit 31.

The UI device 33 is a device that includes a display that receives a user's operation and displays various kinds of information for a user.

In a case where a spot color is designated in an image indicated by the print job received by the print job receiving unit 31, the controller 32 transfers information on a name (a number) of the designated spot color to the color conversion device 40 and determines an amount of toner of the designated spot color on the basis of an instruction from the color conversion device 40.

The color conversion device 40 receives colorimetric values of color sample images of spot colors from a colorimetric device 54 (not illustrated) and stores the colorimetric values thus received in order to determine an amount of toner of a spot color in advance. Upon receipt of information on a name of a spot color, the color conversion device 40 converts the stored colorimetric values into CMYKSi values including silver toner (Si toner) and supplies the CMYKSi values to the controller 32. The following describes the colorimetric value registration unit 41, the colorimetric value storage unit 42, the converter 43, and the color conversion model storage unit 44 that constitute the color conversion device 40.

As the color sample images of spot colors, various color sample images of metallic colors offered by PANTONE (Registered Trademark) Inc. can be used for example.

The colorimetric value registration unit 41 receives, from the colorimetric device 54, plural colorimetric values obtained by colorimetric measurement of a target-color image that is a color sample of a spot color from plural directions and then registers the plural colorimetric values in the colorimetric value storage unit 42. Specifically, as illustrated in FIG. 5, in a case where the target-color image is obliquely irradiated with light, the colorimetric value registration unit 41 receives a colorimetric value of the target color measured in a front direction (45°) that is a direction normal to the target-color image, a colorimetric value of the target-color image measured in a specular direction (15°) that is a direction of specular reflection of the light, and a colorimetric value of the target-color image measured in a diffusion light direction (110°) closer to a light incident direction than to the front direction (45°) and then registers these colorimetric values in the colorimetric value storage unit 42.

Figure 5:
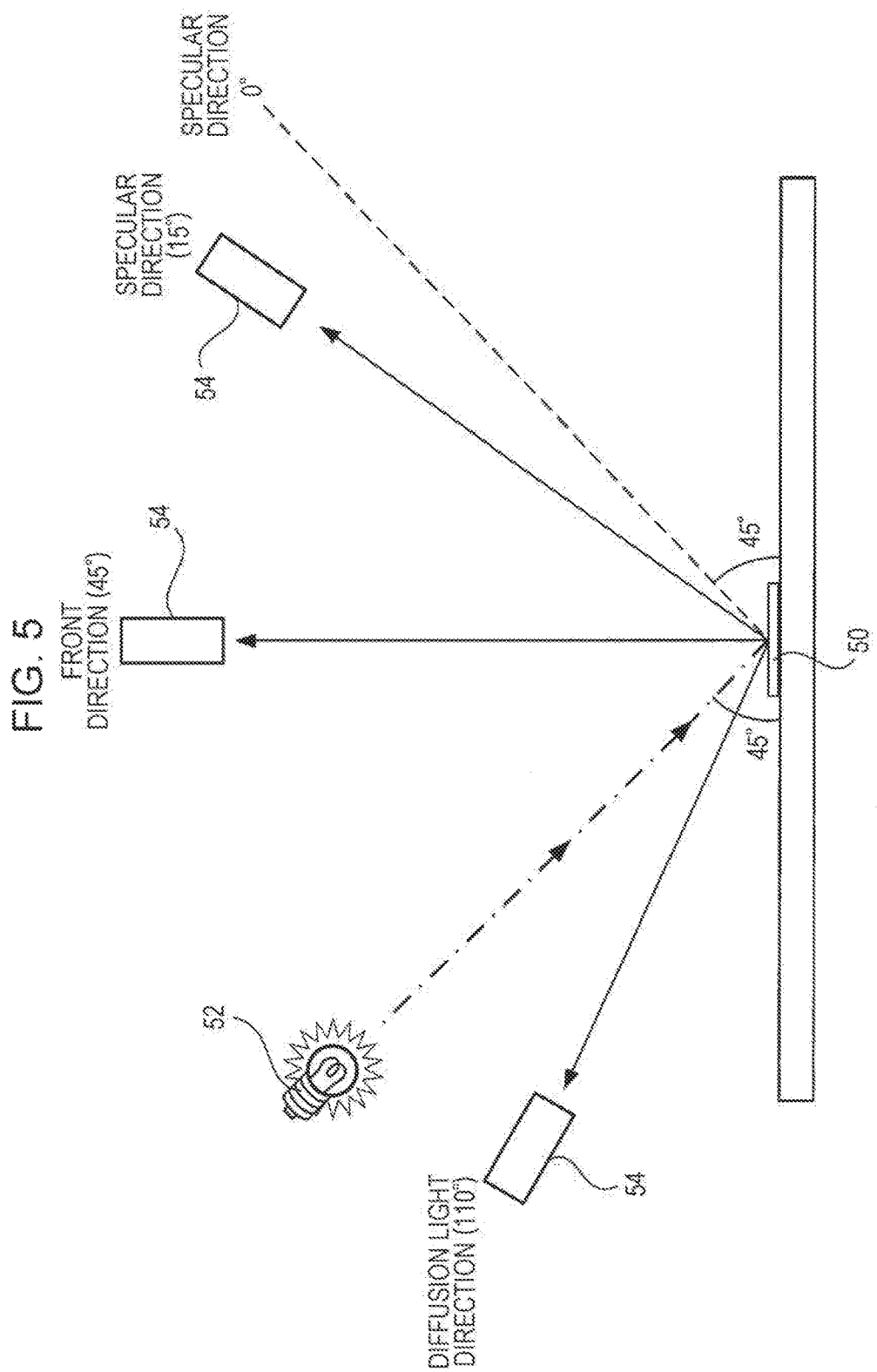
FIG. 5 illustrates a case where a color of an image to be measured is measured from colorimetric directions of three angles (15°, 45°, and 110°)

FIG. 5 illustrates a case where a color of an image to be measured 50 is measured from colorimetric directions of three angles (15°, 45°, and 110°). Specifically, FIG. 5 illustrates a case where the color of the image to be measured 50 is measured from directions of 15°, 45°, and 110° by the colorimetric devices 54 in a case where the image to be measured 50 is irradiated with light emitted from a light source 52 from an oblique direction of 45° and where a specular direction is 0 degree (reference direction).

In FIG. 5, the direction of 45° is a front direction of (a direction normal to) the image to be measured 50. The direction of 15° is a specular direction for measurement of specular light of the image to be measured 50. A reason why the specular direction for measurement of specular light is not a direction of 0 degree but a direction of 15° is that in a case where the image to be measured 50 is measured in the direction of 0 degree, specular light directly enters the colorimetric device 54, and therefore a color shade of the target to be measured cannot be measured.

In FIG. 5, the direction of 110° is set as a diffusion light direction for colorimetric measurement of diffusion light from the image to be measured 50.

In a case where a color of a general image other than an image (e.g., a color sample of a metallic color) having a color shade that changes depending on a viewing direction is measured, the color is measured only from the front direction (45°). A colorimetric method according to the present exemplary embodiment is different from the general colorimetric method in that colorimetric values are obtained by colorimetric measurement not only in the front direction (45°), but also in the specular direction (15° and the diffusion light direction (110°).

It is also possible to calculate color values including an amount of silver toner by using colorimetric values in at least two directions, for example, the front direction (45°) and the specular direction (15°).

The colorimetric value storage unit 42 stores therein colorimetric values in plural colorimetric directions received by the colorimetric value registration unit 41 together with information identifying a spot color such as a name (a number) of the spot color. That is, the colorimetric value storage unit 42 stores, for each target color, plural colorimetric values obtained by measuring a color sample image of a metallic color having a glittering characteristic from plural directions.

FIG. 6 illustrates an example of colorimetric values stored in the colorimetric value storage unit 42. In FIG. 6, an L* value, an a* value, and a b* value of a spot color in the specular direction (15°), the front direction (45°), and the diffusion light direction (110°) are stored in the colorimetric value storage unit 42 together with a name of the spot color such as a custom color 1 or a custom color 2. Note that spot colors given the names "custom color 1" and "custom color 2" are spot colors in a color sample or spot colors adjusted or created by a user himself or herself.

Upon receipt of designation of information on a spot color name from the controller 32, the converter 43 reads out colorimetric values of the spot color from the colorimetric value storage unit 42 and then converts the colorimetric values in the plural colorimetric directions thus read out into color values (CMYKSi) including a value Si indicative of a toner amount of silver toner that is a glittering color material and values CMYK indicative of toner amounts of toner other than the silver toner.

Figure 7:
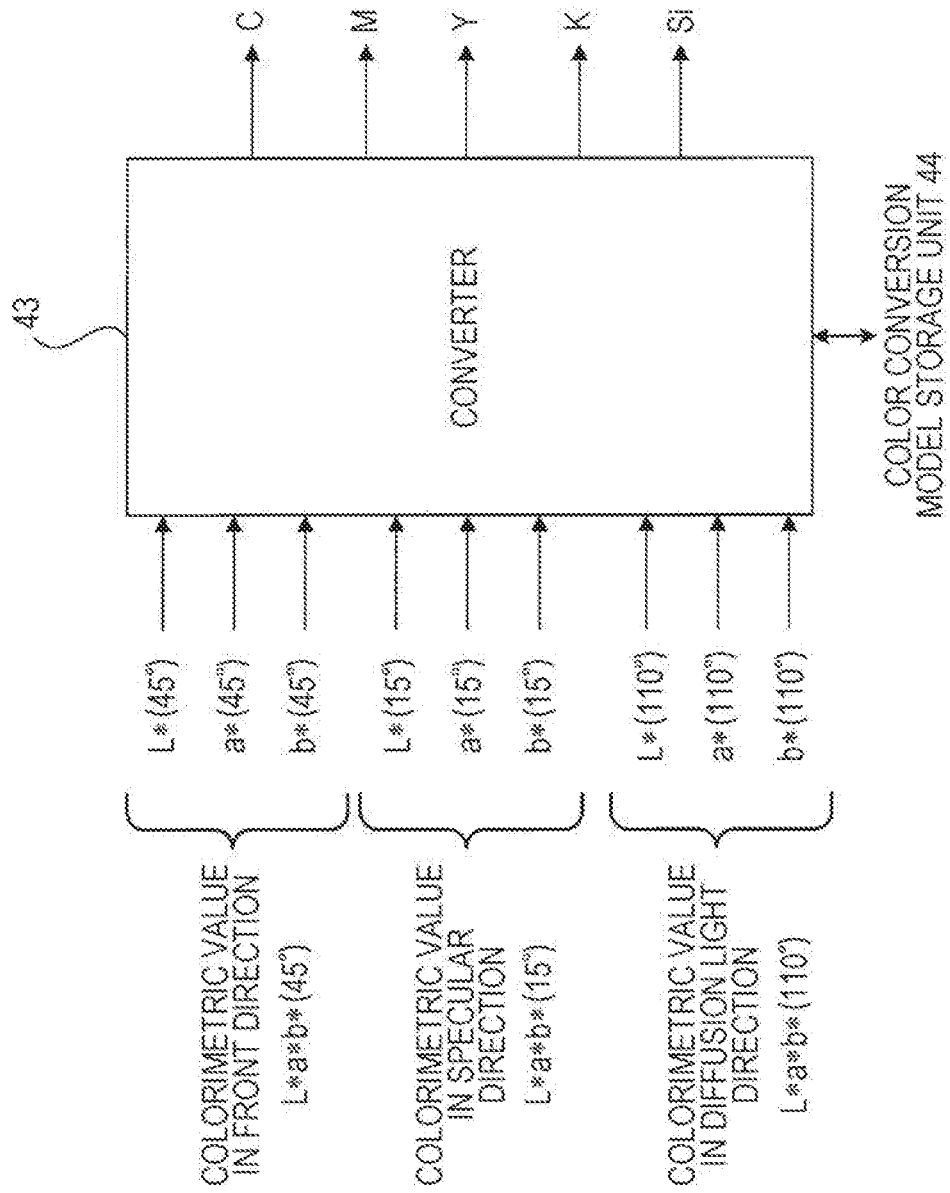
FIG. 7 illustrates how a converter converts colorimetric values in the colorimetric directions of three angles into values (CMYKSi) indicative of amounts of toner of respective colors.

FIG. 7 illustrates how the converter 43 converts colorimetric values in the colorimetric directions of three angles into values (CMYKSi) indicative of toner amounts of toner of the respective colors.

In the present exemplary embodiment, a case where colorimetric values output from the colorimetric device 54 are signals expressed by the International Commission on Illumination (CIE) L*a*b* color system is described. Accordingly, in the following description, colorimetric values in the front direction (45°) are expressed as L*a*b* (45°), colorimetric values in the specular direction (15°) are expressed as L*a*b* (15°), and colorimetric values in the diffusion light direction (110°) are expressed as L*a*b* (110°).

As illustrated in FIG. 7, the converter 43 receives colorimetric values (L*(45°), a*(45°), and b*(45°)) in the front direction, colorimetric values) (L*(15°), a*(15°), and b*(15°)) in the specular direction, and colorimetric values) (L*(110°), a*(110°), and b*(110°)) in the diffusion light direction and then output CMYKSi values by using a color conversion model stored in the color conversion model storage unit 44. Details of the process in which the converter 43 converts received colorimetric values into CMYKSi values by using a color conversion model will be described later.

In such a case where a spot color is designated in a print job received by the print job receiving unit 31, the controller 32 controls the output unit 34 to output an image on the basis of color values (CMYKSi) obtained by conversion in the converter 43 of the color conversion device 40.

The color conversion model storage unit 44 stores therein a color conversion model $((L^*, a^*, b^*)=f(C, M, Y, K, Si, \theta))$ in which a combination of colorimetric directions and toner amounts of toner of the respective colors and actually measured colorimetric values are associated.

Figure 8:
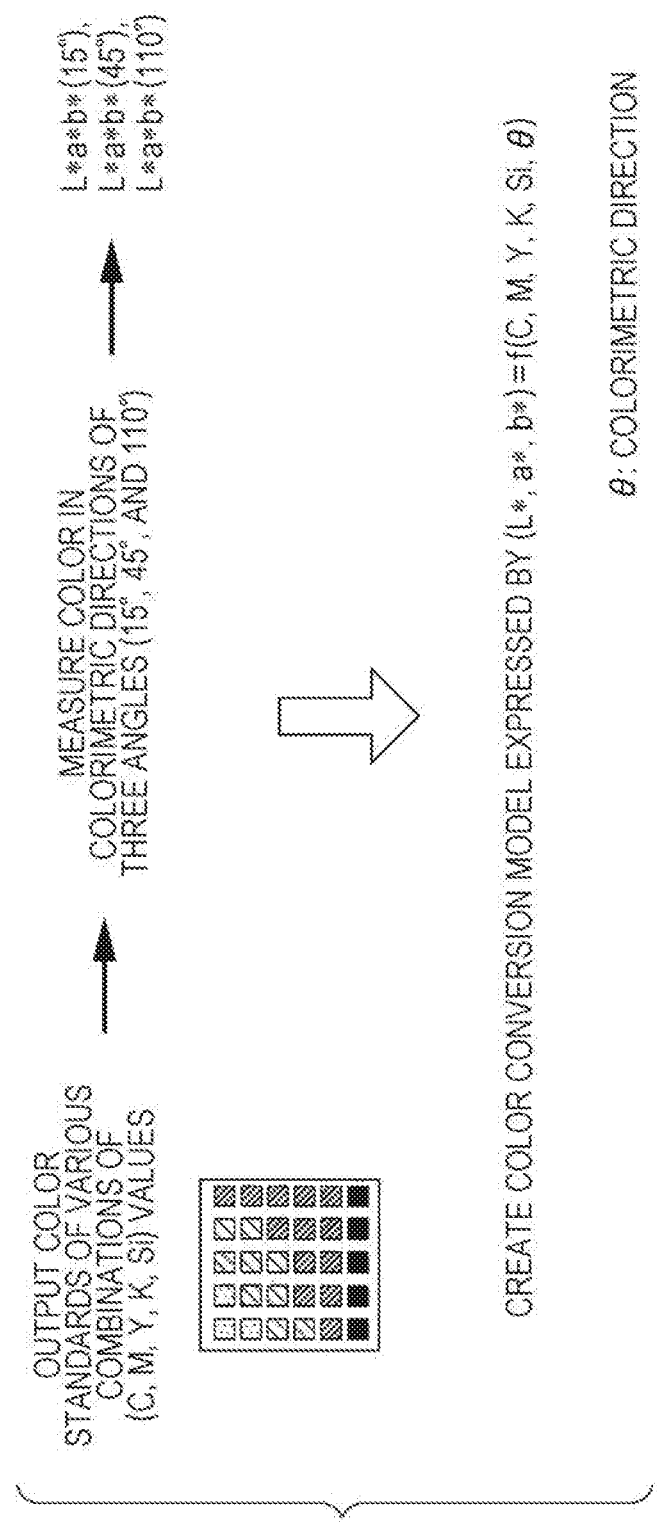
FIG. 8 is a view for explaining a method for creating a color conversion model stored in a color conversion model storage unit.

A method for creating a color conversion model in the color conversion model storage unit 44 is described below with reference to FIG. 8.

First, color chip (patch) images of various combinations of C, M, Y, K, and Si values are output. Then, a color of each of the color chips is measured in the colorimetric directions of three angles (15°, 45°, and 110°) by the colorimetric method illustrated in FIG. 5. As a result, colorimetric values L*a*b* (15°), L*a*b* (45°), and L*a*b* (110°) are obtained for each of the color chips.

Then, a color conversion model by which color values $(L^*, a^*, b^*)$ are obtained by input of (C, M, Y, K, Si, $\theta$ (colorimetric direction)) is created on the basis of these values.

Specifically, plural combinations of (C, M, Y, K, Si, $\theta$) and $(L^*, a^*, b^*)$ are obtained by measuring colors reproduced by various combinations of C, M, Y, K, Si, and $\theta$ values and thus obtaining L*a*b* values in advance. A functional relationship $(L^*, a^*, b^*)=f(C, M, Y, K, Si, \theta)$ is obtained by using these combinations, and this functional relationship can be used as a color conversion model. Use of this color conversion model makes it possible to find predicted color values L*a*b* when toner amounts CMYKSi of the respective colors and the colorimetric direction $\theta$ are given. A general function as a color conversion model such as interpolation using a multiple regression equation, a neural network, or a direct lookup table can be used as a function used for the color conversion model.

In this way, a color conversion model (a color conversion model for reference sheet) expressed by the function $(L^*, a^*, b^*)=f(C, M, Y, K, Si, \theta)$ is created, and the created color conversion model is stored in the color conversion model storage unit 44.

Figure 9:
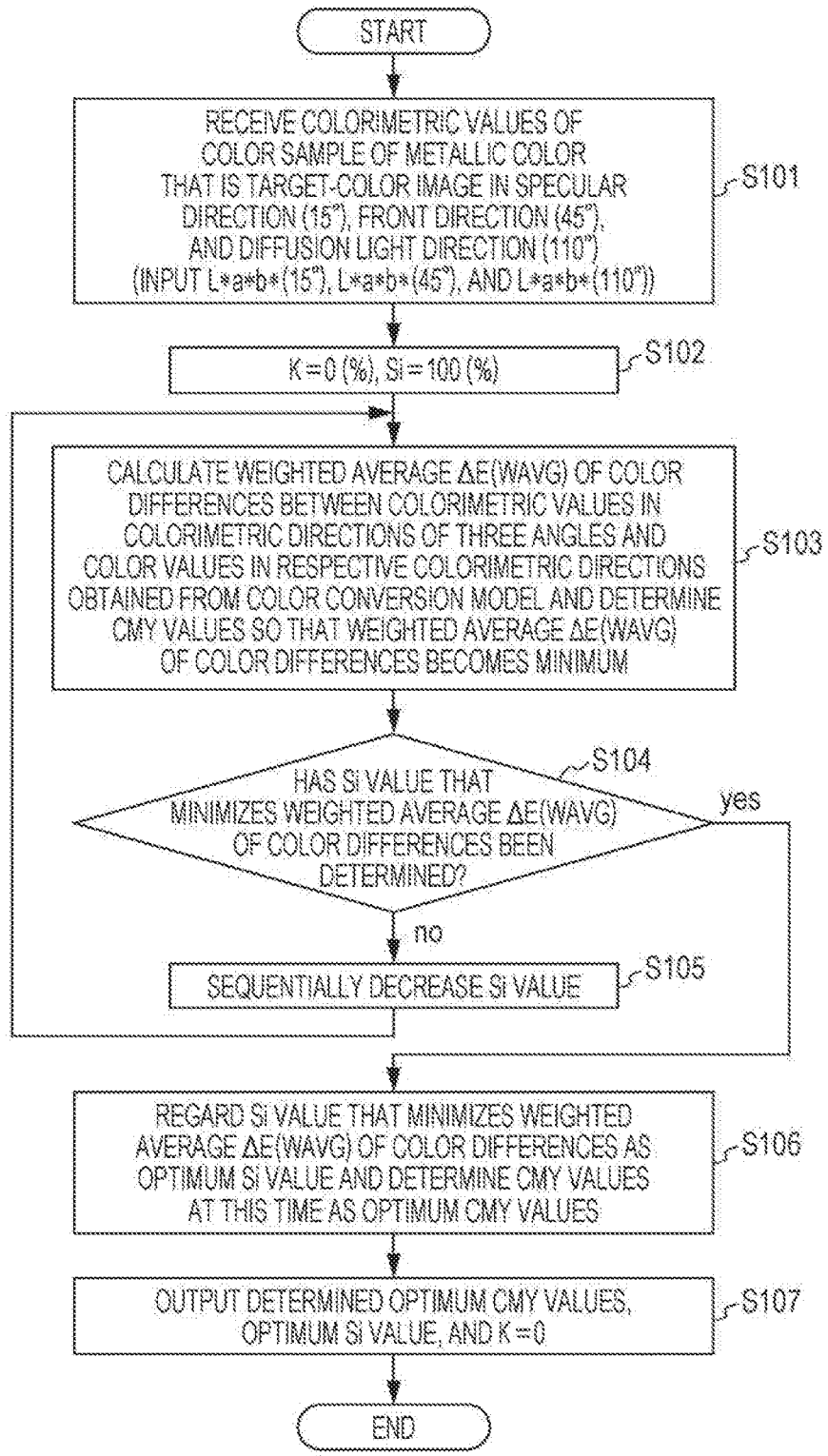
FIG. 9 is a flowchart for explaining an operation of a color conversion device in the image forming apparatus according to the exemplary embodiment of the present invention.

Next, an operation of the color conversion device 40 in the image forming apparatus 10 according to the present exemplary embodiment is described with reference to the flowchart of FIG. 9.

First, the colorimetric value registration unit 41 receives colorimetric values (L*a*b*(15°), L*a*b*(45°), and L*a*b*(110°) of a color sample of a metallic color that is a target-color image in the specular direction (15°), the front direction (45°), and the diffusion light direction) (110°) (Step S101). Then, the colorimetric values measured from the three colorimetric directions and received by the colorimetric value registration unit 41 are stored in the colorimetric value storage unit 42 together with information on a spot color name.

Then, in a case where a spot color name is designated by the controller 32 and a toner amount of the designated spot color is to be determined, the converter 43 first sets a K value to 0(%) and sets a Si value to 100(%) (Step S102).

Next, the converter 43 determines a combination of color material amounts that minimizes an average of color differences between the colorimetric values of the target-color image in the colorimetric directions of the three angles and color values in the colorimetric directions obtained from the color conversion model (Step S103).

Specifically, the converter 43 calculates a weighted average $\Delta E$ (WAVG) of color differences between the colorimetric values of the target-color image in the colorimetric directions of the three angles and the color values in the colorimetric directions obtained from the color conversion model and determines CMY values that minimize the weighted average $\Delta E$ (WAVG) of the color differences.

Figure 10:
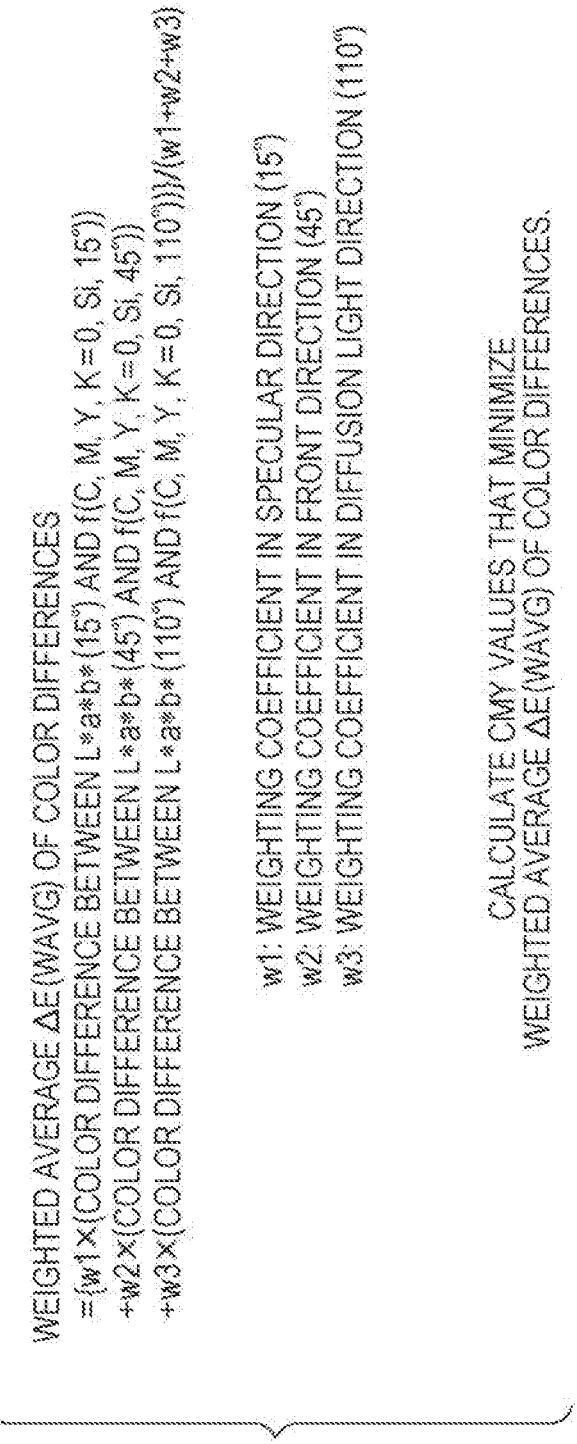
FIG. 10 is a view for explaining a target function used for color conversion in the converter.

A specific example of the weighted average $\Delta E$ (WAVG) of the color differences is described with reference to FIG. 10. As illustrated in FIG. 10, a weighted average is calculated according to the following formula:

weighted average $\Delta E$ (WAVG) of color differences in colorimetric directions={w1×(color difference between ($L^*a^*b^*(15°)$ and $f(C, M, Y, 0, Si, 15)$)+w2×(color difference between ($L^*a^*b^*(45°)$ and $f(C, M, Y, 0, Si, 45)$)+w3×(color difference between ($L^*a^*b^*(110°)$ and $f(C, M, Y, 0, Si, 110)$)}/(w1+w2+w3).

In this formula, w1, w2, and w3 are weighting coefficients in the specular direction (15°), the front direction (45°), and the diffusion light direction (110°), respectively, and are usually set to the same value.

For example, in a case where the color differences in the respective colorimetric directions are weighted by using the same value, the weighting coefficients w1, w2, and w3 need just be set to w1=w2=w3=1. In this case, the weighted average $\Delta E$ (WAVG) of the color differences is a simple average.

In a case where a metallic feeling of an output image is adjusted, w1, w2, and w3 need just be changed. For example, in a case where the weighting coefficient w1 is set larger than the weighting coefficients w2 and w3, CMY values are determined so that the color difference in the specular direction (15°) is made smaller, and as a result an image having a more metallic feeling can be obtained.

Note that a color difference $\Delta E$ (PQ) between color values $P=(L_1^*, a_1^*, b_1^*)$ and color values $Q=(L_2^*, a_2^*, b_2^*)$ is calculated by the following calculation formula:

$\Delta E\ (PQ) = ((L_1^* - L_2^*)^2 + (a_1^* - a_2^*)^2 + (b_1^* - b_2^*)^2)^{1/2}$ Then, the converter 43 calculates CMY values that minimize the weighted average $\Delta E$ (WAVG) of the color differences. As a specific method in which the converter 43 calculates CMY values that minimize the weighted average $\Delta E$ (WAVG) of the color differences, for example, a typical method for solving an optimization problem by applying a numerical solution of a non-linear equation such as a simplex method or a Newton method can be used.

In a case where an Si value that minimizes the weighted average $\Delta E$ (WAVG) of the color differences is determined (yes in Step S104), the processing proceeds to Step S106. However, since the Si value has not been determined yet (no in Step S104), the converter 43 sequentially decreases the Si value from 100%, for example, to 99%, 98%, and 97%, (Step S105).

Then, the converter 43 performs the process in Step S103 again and repeats the process until the Si value that minimizes the weighted average $\Delta E$ (WAVG) of the color differences is determined. In a case where the Si value that minimizes the weighted average $\Delta E$ (WAVG) of the color differences is determined (yes in Step S104), this Si value is regarded as an optimum Si value (Step S106).

A method for determining the optimum Si value is described below with reference to FIG. 11.

Figure 11:
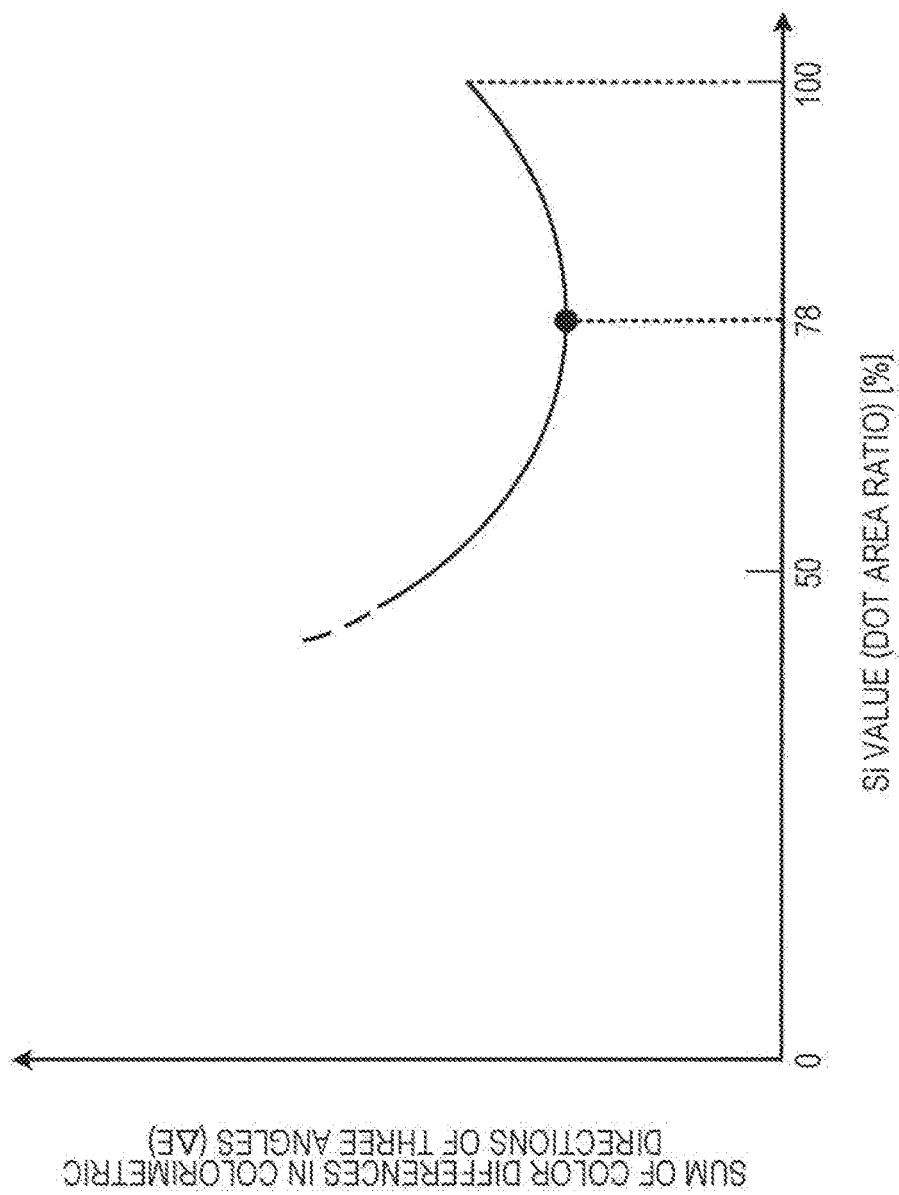
FIG. 11 is a view for explaining a method for determining an optimum Si value.

It is assumed that the weighted average $\Delta E$ (WAVG) of the color differences is changed as illustrated in FIG. 11 by calculating the weighted average $\Delta E$ (WAVG) of the color differences in the colorimetric directions of the three angles while sequentially decreasing the Si value from 100% as described above. In the case illustrated in FIG. 11, the optimum Si value is 78% at which the weighted average $\Delta E$ (WAVG) of the color differences is minimum.

Then, the converter 43 determines that CMY values obtained when the optimum Si is obtained are optimum CMY values (Step S106). That is, the converter 43 determines an optimum Si value that minimizes a minimum value of a weighted average of color differences by sequentially calculating, for each of different toner amounts of Si toner, a minimum value of the weighted average of the color differences obtained in a case where toner amounts of CMY toner other than Si toner are changed without changing a toner amount of Si toner, and then determines a combination of toner amounts that minimizes the weighted average of the color differences by determining toner amounts of CMY toner obtained when the optimum Si value is determined.

Finally, the converter 43 supplies the optimum CMY values, the optimum Si value, and K=0(%) to the controller 32 as toner amounts CMYKSi for the measured color sample image of the metallic color (Step S107).

In this way, the converter 43 determines a toner amount of Si toner that minimizes a minimum value of a weighted average $\Delta E$ (WAVG) of color differences by sequentially calculating, for each of different toner amounts of Si toner, the weighted average $\Delta E$ (WAVG) of the color differences obtained in a case where toner amounts of toner (CMY) other than the Si toner are changed without changing a toner amount of the Si toner, and then determines a combination of toner amounts that minimizes the average of the color differences by determining toner amounts of toner other than the Si toner obtained when the toner amount of Si toner is determined.

Next, a reason why the color conversion device 40 according to the present exemplary embodiment determines toner amounts of CMYKSi toner for reproduction of a color sample image of a metallic color by using colorimetric values measured in colorimetric directions of three angles (15°, 45°, and 110°) is described below.

Figure 12:
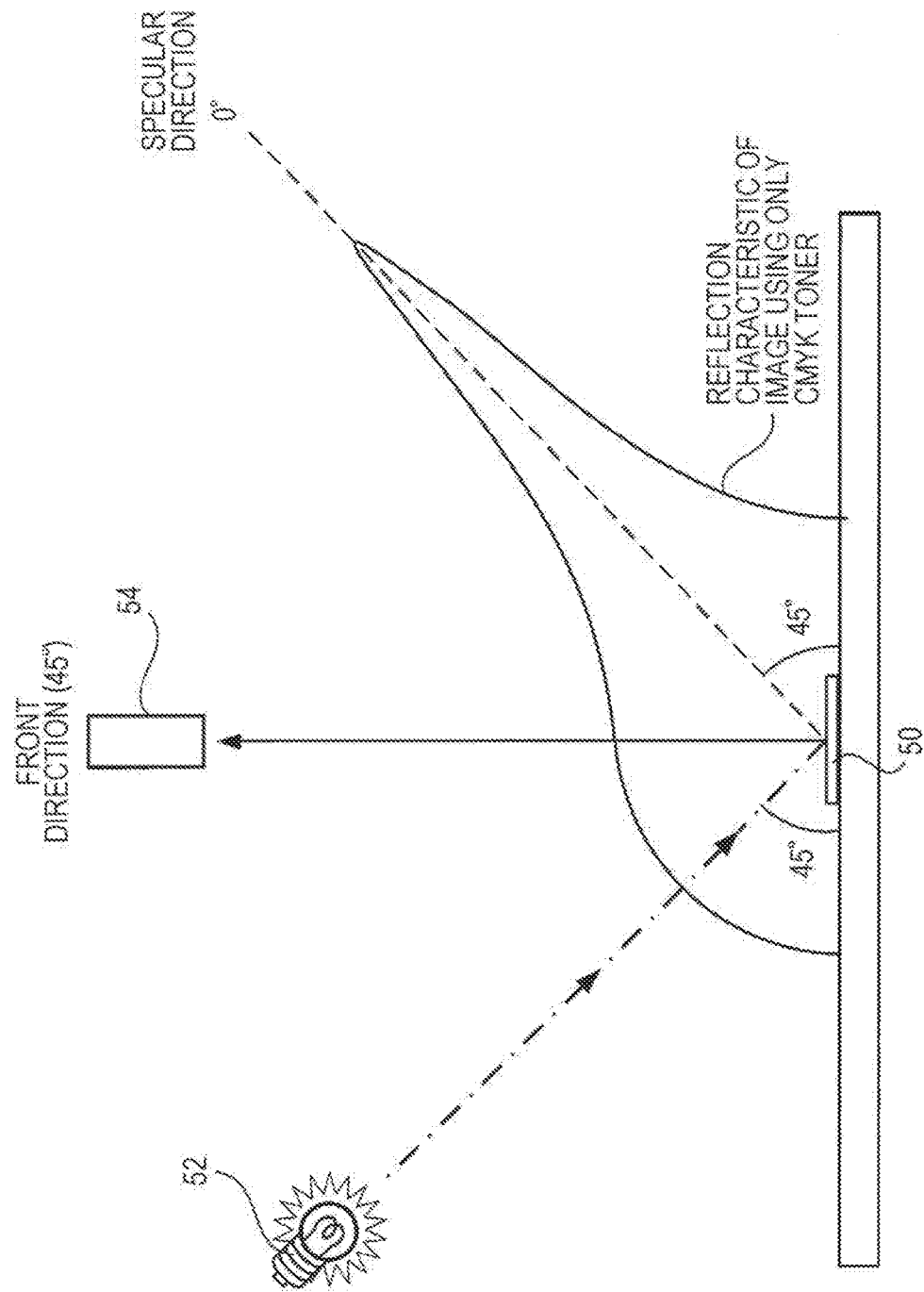
FIG. 12 is a view for explaining a method for measuring a color of a general image using only CMYK toner.

First, a colorimetric method for a general image using only CMYK toner is described with reference to FIG. 12. As illustrated in FIG. 12, a general image that does not include metallic-color toner and uses only CMYK toner has reflection characteristics such that a light amount in a specular direction is larger than light amounts in other directions, but light amounts of diffusion light in directions other than the specular direction are almost uniform. Accordingly, according to a general colorimetric method, an image to be measured 50 is obliquely irradiated with light emitted from the light source 52, and a color value in a front direction (45°) is measured by the colorimetric device 54.

Figure 13:
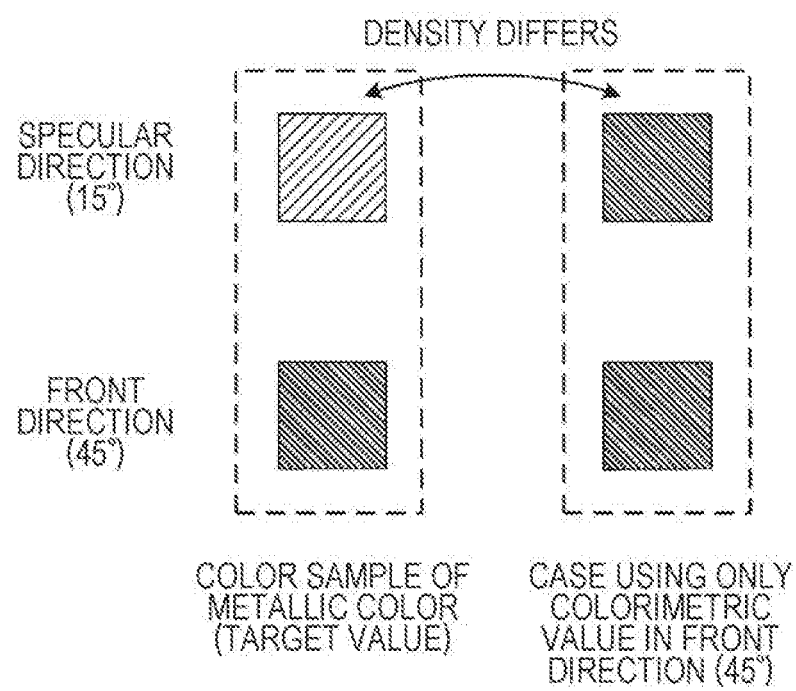
FIG. 13 is a view for explaining a problem that occurs in a case where a color sample image of a metallic color is reproduced by using only colorimetric values in a front direction (45°)

A problem that occurs in a case where a color sample image is reproduced by determining toner amounts of CMYKSi toner on the basis of colorimetric values obtained by measuring a color sample of a metallic color according to such a general colorimetric method is described with reference to FIG. 13.

In a case where a color sample of a metallic color is reproduced by using only colorimetric values in the front direction (45°), it is possible to almost reproduce a color shade in the front direction (45°). However, for example, a color shade viewed in the specular direction at 15° sometimes differs markedly. In the example illustrated in FIG. 13, a density of a reproduced image printed by using CMYKSi toner is higher than (i.e., differs from) a density of the actual color sample of the metallic color when viewed from the specular direction at 15°.

Under a general environment, an observed object is irradiated with light from various directions and reflect the light, and a person perceives a color of the object by looking at the various reflected light beams. Accordingly, even in a case where only a color viewed from a certain direction is reproduced, for example, in a metallic-color image whose color changes markedly depending on a viewing direction but in a case where a color shade viewed from other directions markedly differs from an actual image, a color shade viewed under actual lighting also changes.

Figure 14:
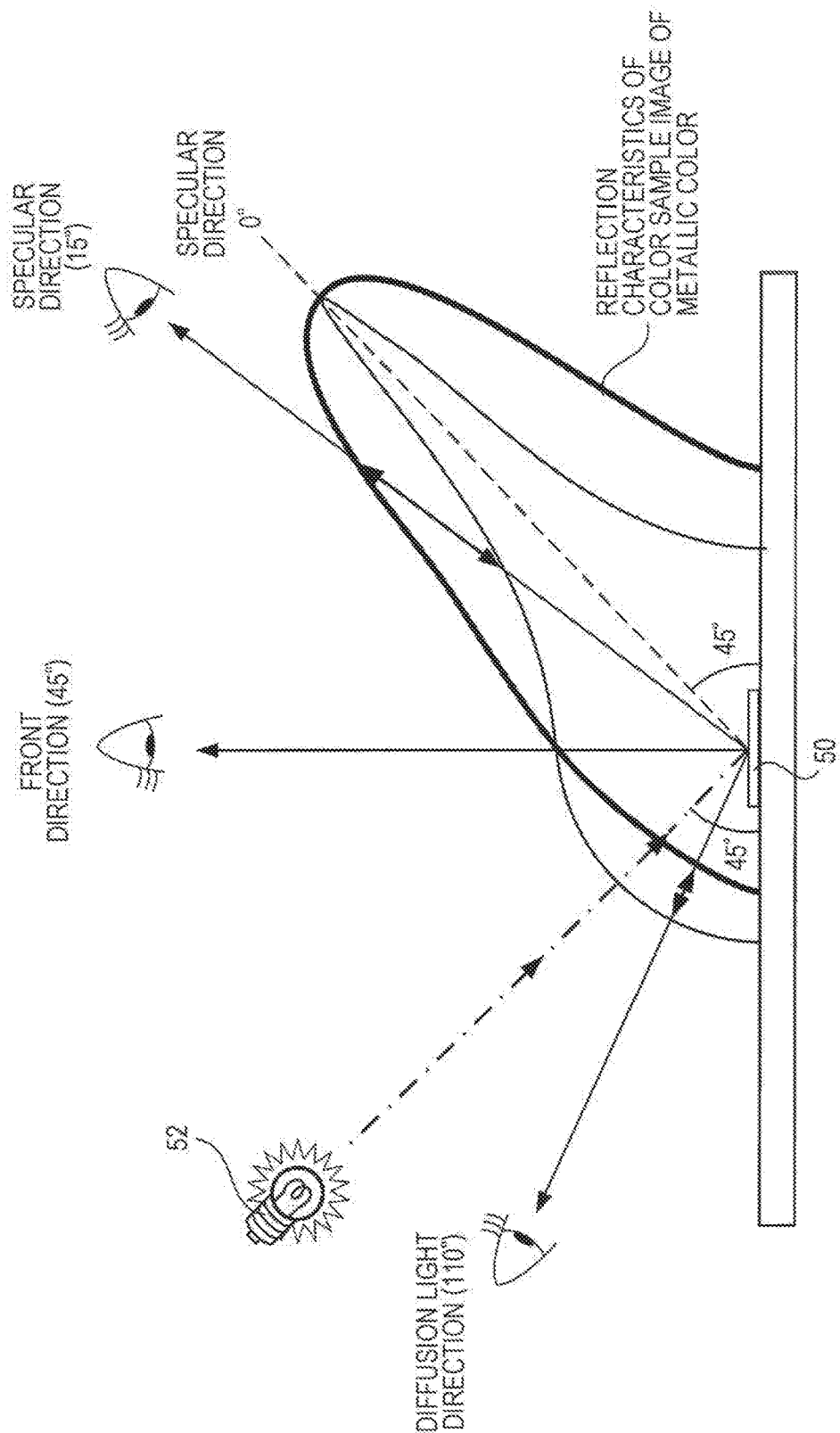
FIG. 14 is a view for explaining a difference in reflection characteristics between a CMYK toner image and a color sample image of a metallic color.

Next, a difference in reflection characteristics between CMYK toner image and a color sample image of a metallic color is described with reference to FIG. 14.

A color sample image of a metallic color has higher lightness in the specular direction (15°) and lower lightness in the diffusion light direction (110°) than a CMYK toner image due to a difference in reflection characteristics.

For this reason, the color conversion device 40 according to the present exemplary embodiment determines amounts of CMYKSi toner that make an average of color differences in colorimetric directions small by using not only colorimetric values in the front direction (45°), but also colorimetric values in the specular direction (15° and the diffusion light direction (110°) and thereby reproduces an image close to a color sample image when viewed from any direction.

Figure 15:
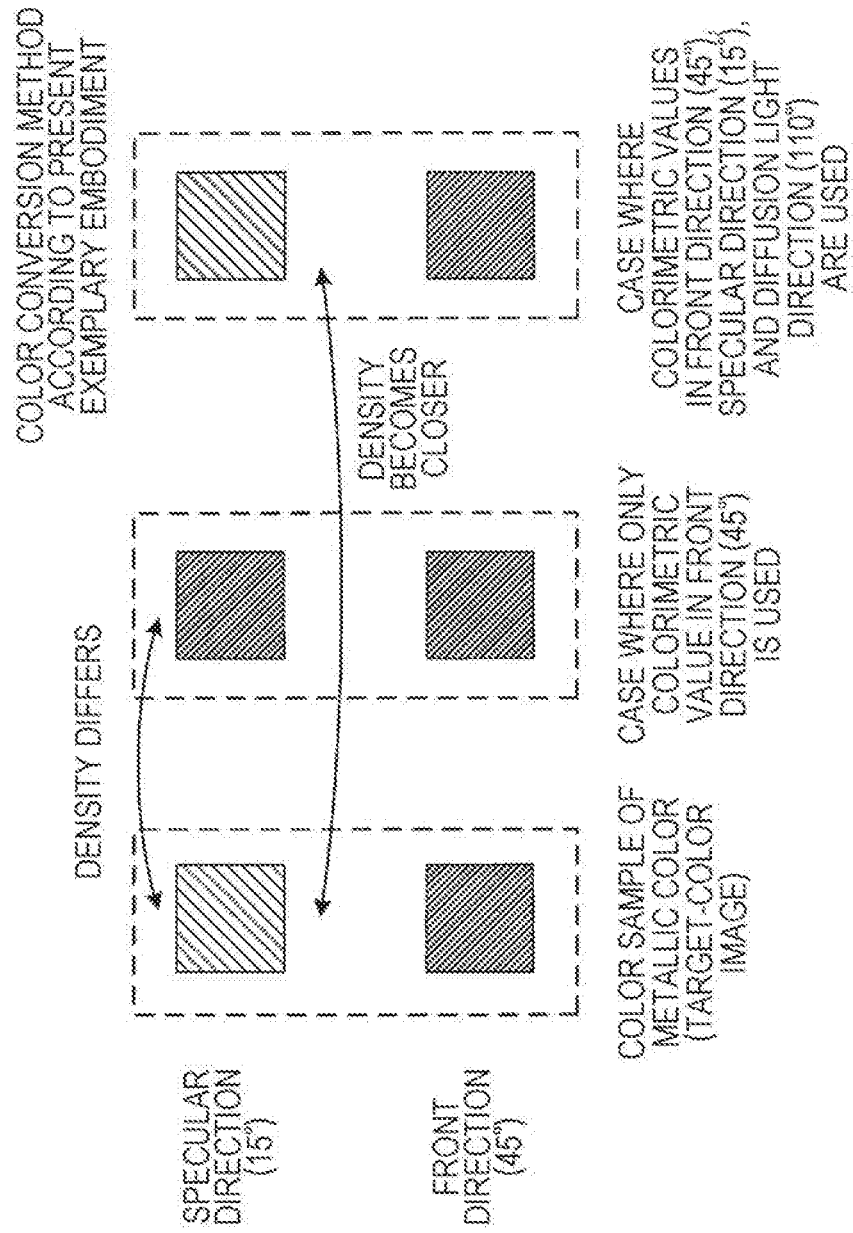
FIG. 15 illustrates an example of an image obtained in a case where a color sample image of a metallic color is printed by determining toner amounts by the color conversion method according to the exemplary embodiment of the present invention.

An example of an image obtained in a case where a color sample image of a metallic color is printed by the image forming apparatus 10 according to the present exemplary embodiment that determines toner amounts by such a color conversion method is illustrated in FIG. 15.

As illustrated in FIG. 15, in a case where an image is printed by using CMYKSi toner of amounts determined by the color conversion method according to the present exemplary embodiment, not only a color shade viewed from the front direction (45°) but also a color shade viewed from the specular direction (15°) are close to the color sample image of the metallic color. Furthermore, although lightness of a color shade viewed from the diffusion light direction (110°) is slightly higher than that of the color sample image (not illustrated in FIG. 15), a density in the specular direction) (15°) can be made close to that of the color sample image without making a color difference in the diffusion light direction (110°) large since toner amounts are determined by reflecting the color difference in the diffusion light direction (110°).

According to the toner amount determining method described above, it is possible to determine toner amounts of CMYKSi toner for printing a target-color image having higher color reproducibility viewed from plural directions.

Furthermore, in the image forming apparatus 10 according to the present exemplary embodiment, colorimetric values of each spot color stored in the colorimetric value storage unit 42 are changeable. Specifically, in a case where a user wants to adjust a color shade or a luster feeling of an image output by the output unit 34, the user can change colorimetric values in colorimetric directions stored in the colorimetric value storage unit 42.

Specifically, the UI device 33 receives color information for specifying a target color to be printed. Then, the controller 32 performs a control operation for reading out plural colorimetric values stored corresponding to the target color of the color information received by the UI device 33 from the colorimetric value storage unit 42 and then causing the plural colorimetric values to be displayed on a display of the UI device 33.

Then, the UI device 33 receives a change of the plural colorimetric values displayed on the display by the controller 32. The controller 32 causes the change received by the UI device 33 to be reflected in the colorimetric values stored in the colorimetric value storage unit 42.

As a result, the converter 43 converts the plural colorimetric values reflecting the change received by the UI device 33 into color values including a value indicative of a toner amount of metallic toner and values indicative of toner amounts of toner other than the metallic toner.

An example of a screen displayed in a case where colorimetric values stored in the colorimetric value storage unit 42 are changed is described below with reference to FIGS. 16 through 18.

Figure 16:
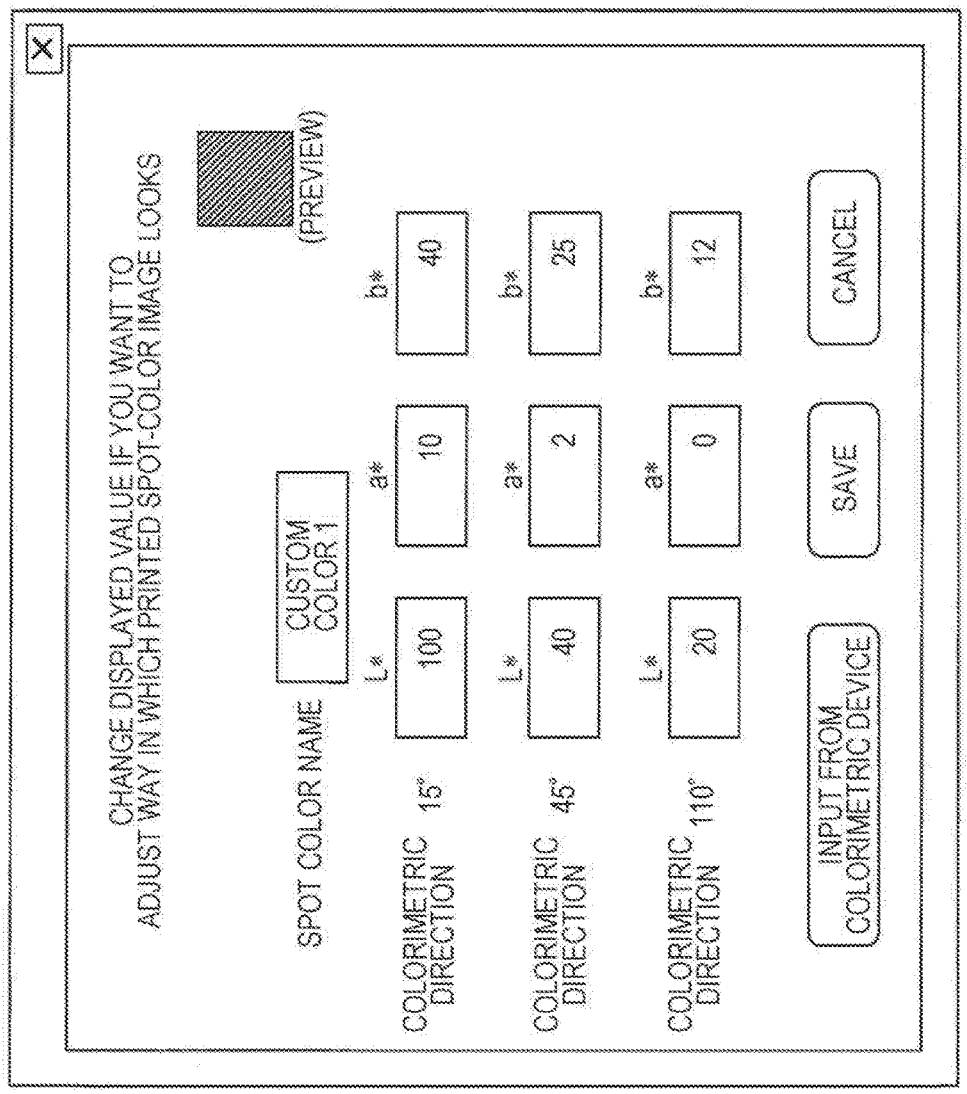
FIG. 16 illustrates an example of a screen displayed in a case where colorimetric values stored in the colorimetric value storage unit are displayed on the screen by designating a spot color name.

First, an example of a screen displayed in a case where colorimetric values stored in the colorimetric value storage unit 42 are displayed on the screen by designating a spot color name is illustrated in FIG. 16.

FIG. 16 illustrates an example in which colorimetric values in the colorimetric directions (15°, 45°, and 110°) that are stored corresponding to "custom color 1" are displayed by designating "custom color 1" as a spot color name.

In a case where colorimetric values newly measured are registered in the colorimetric value storage unit 42, the colorimetric values are displayed as illustrated in FIG. 16 by measuring a spot color to be registered with the use of the colorimetric device 54 and touching an "input from colorimetric device" button. Then, when a user enters a name of the spot name and touches a "save" button, the colorimetric values are stored in the colorimetric value storage unit 42 so as to be associated with the entered spot color name.

Figure 17:
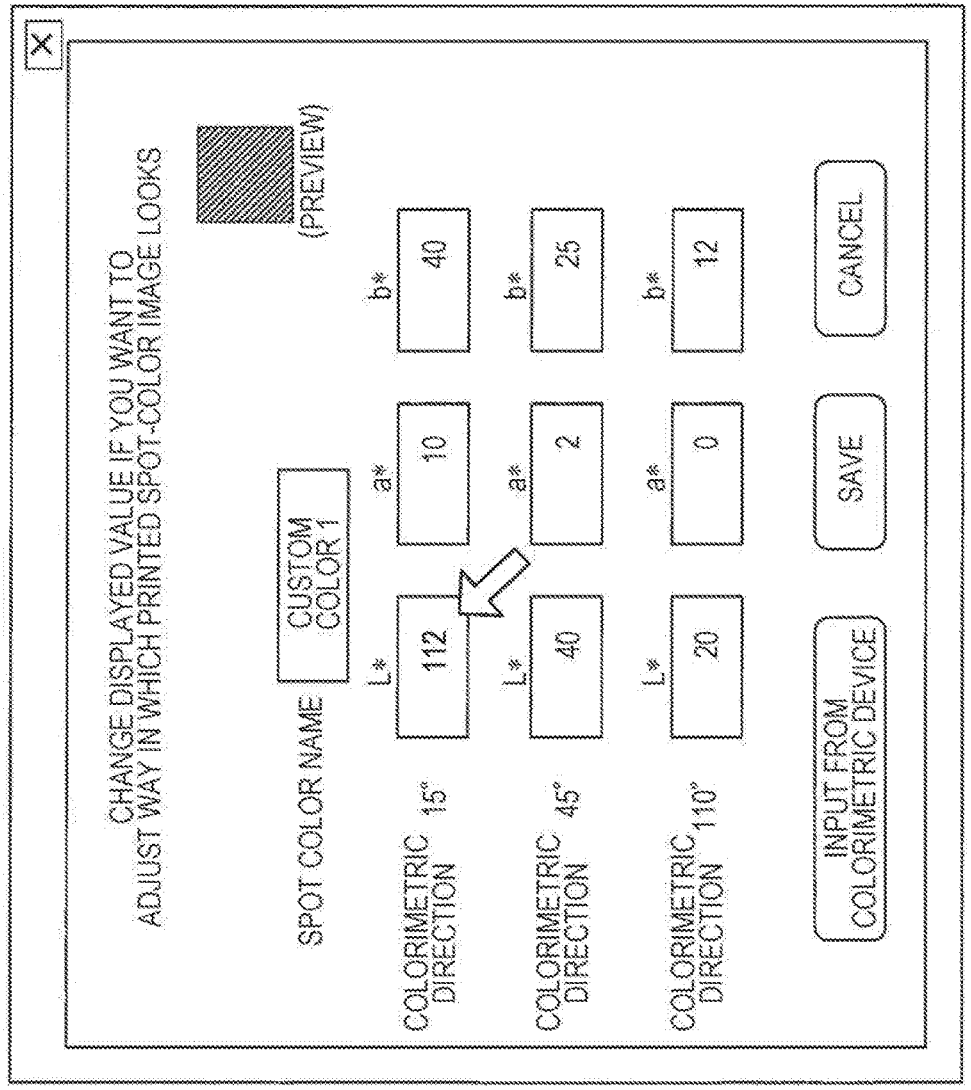
FIG. 17 illustrates an example of a screen displayed in a case where a user changes the colorimetric values stored in the colorimetric value storage unit.

FIG. 17 illustrates an example of a screen displayed in a case where the colorimetric values stored in the colorimetric value storage unit 42 are changed by a user.

In the example of the screen illustrated in FIG. 17, a user changes lightness information ($L^*(15°)$) in the specular direction (15°) among the colorimetric directions from "100" to "112".

As a result of the change of the colorimetric value, a preview image on the screen is changed to an image based on the changed value.

Finally, when the user touches the "save" button after changing the colorimetric value, the changed colorimetric value is stored in the colorimetric value storage unit 42. Accordingly, in a case where "custom color 1" is designated for the converter 43 by the controller 32 after this changing process, the converter 43 calculates toner amounts based on the changed colorimetric value and notifies the controller 32 of the toner amounts thus calculated. As a result, a spot-color image of "custom color 1" output from the output unit 34 is based on the changed colorimetric value.

In a case where a colorimetric value in each colorimetric direction is changeable as in the present exemplary embodiment, a color shade, lightness, and the like can be adjusted for each direction in which the output spot-color image is viewed. Even if a user tries to adjust a color of an output image by changing toner amounts of CMYKSi in the controller 32, it is difficult for the user to judge for which color a toner amount should be adjusted in order to change a luster feeling and in which viewing direction a color shade can be changed by adjustment of a toner amount in a case where the user is unaccustomed to color adjustment.

A luster feeling and a color shade of an image using a color material having a glittering characteristic such as silver toner are achieved by balance between the color material having a glittering characteristic and a color material that does not have a glittering characteristic. Therefore, even if an Si value that is a toner amount of silver toner is merely increased, there is a possibility that a desired output result cannot be obtained due to unbalance between a luster feeling and other colors.

In view of this, a color of a target-color image is adjusted not by changing toner amounts (CMYKSi) but by changing colorimetric values (L*a*b*) in the colorimetric directions. This allows the user to easily and intuitively adjust image quality of the target-color image to be printed.

FIG. 16 illustrates an example of a screen on which all of colorimetric values (an L* value, an a* value, and a b* value) in the colorimetric directions at the three angles (15°, 45°, and 110°) are changeable. However, in a case where all of the values are changeable, it is sometimes difficult for the user to judge which value should be adjusted.

Figure 18:
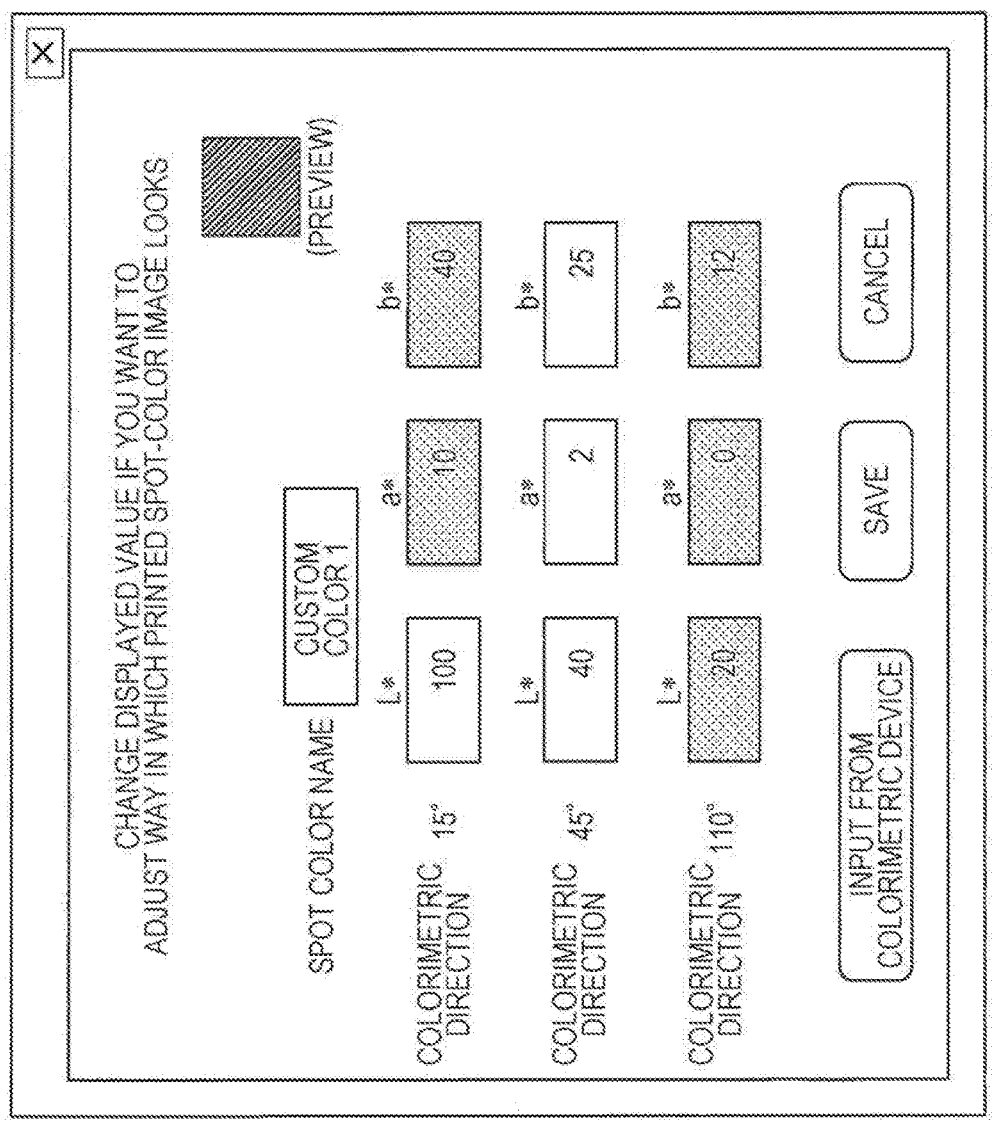
FIG. 18 illustrates an example of a screen displayed in a case where all of colorimetric values (an L* value, an a* value, and a b* value) measured in a front direction (45°) and lightness information (an L* value) among colorimetric values measured in a specular direction are displayed in a changeable manner.

In view of this, only a specific value among the colorimetric values in the plural colorimetric directions may be changeable, as illustrated in FIG. 18. FIG. 18 illustrates a case where at least all of the colorimetric values (an L* value, an a* value, and a b* value) measured in the front direction (45°) and lightness information (an L* value) among the colorimetric values measured in the specular direction are changeable on the display of the UI device 33.

A reason why all of the colorimetric values (the L* value, the a* value, and the b* value) measured in the front direction (45°) are changeable is that a color shade viewed from the front direction of the spot-color image to be printed is made adjustable.

A reason why only lightness information (the L* value) among the colorimetric values measured in the specular direction (15°) is changeable is that a luster feeling of the spot color to be printed can be adjusted by changing the lightness information (the L* value) in the specular direction (15°). In a case where the lightness information (the L* value) in the specular direction (15°) is increased, the luster feeling increases, whereas in a case where the lightness information (the L* value) in the specular direction (15°) is decreased, the luster feeling decreases.

In FIG. 18, the colorimetric values in the diffusion direction (110°) and values (an a* value and a b* value) other than the lightness information (the L* value) in the specular direction (15°) are unlikely to be changed and are therefore grayed out so as to be unchangeable.

Although a case where colorimetric values are expressed by a CIE L*a*b* color space that is a color system including at least lightness information has been described, a color system expressed by another color space may also be used as long as the color system includes lightness information.

For example, colorimetric values may be expressed by an L*c*h color system. In the L*c*h color system, an L* value is lightness information, a c* value is chroma information, and an h value is a hue angle.

The c* value and the h value are expressed by the following formulas based on an a* value and a b* value in the L*a*b* color system:

$$c^* = ((a^*)^2 + (b^*)^2)^{1/2}$$

$$h = \tan^{-1}(b^*/a^*)$$

Although a case where colorimetric values stored in the colorimetric value storage unit 42 are changed by the controller 32 has been described in the above exemplary embodiment, colorimetric values may be changed by a user's operation when the colorimetric values received from the colorimetric device 54 by the colorimetric value registration unit 41 are registered in the colorimetric value storage unit 42.

Although a case where toner amounts of respective colors including silver toner are calculated by using colorimetric values in colorimetric directions of three angles, i.e., the specular direction (15°), the front direction (45°), and the diffusion light direction (110°) has been described above, the toner amounts may be calculated by using colorimetric values in colorimetric directions of multiple angles of three or more, for example, four angles or five angles. For example, a case where a color of an image to be measured 50 is measured in colorimetric directions of five angles, i.e., a specular direction (15°), a specular direction (25°), a front direction (45°), a diffusion light direction (75°), and a diffusion light direction (110°) is illustrated in FIG. 19.

Use of the colorimetric values in the colorimetric directions of the five angles obtained by the colorimetric method illustrated in FIG. 19 also makes it possible to calculate toner amounts of respective colors including silver toner by a method similar to the method described above.

That is, toner amounts of respective colors may be calculated by using colorimetric values of a target-color image measured in a direction (25°) closer to the specular direction (15°) than to the front direction (45°) and colorimetric values of the target-color image measured in a diffusion light direction (75°) between the front direction (45°) and an irradiation direction of the light source 52 in addition to colorimetric values in the specular direction (15°), the front direction (45°), and the diffusion light direction (110°). Furthermore, colorimetric values measured in a colorimetric direction other than the colorimetric directions illustrated in FIG. 19 may be used.

A color shade viewed under actual light can be made closer to a color sample image as the number of colorimetric values used for calculation of toner amounts becomes larger.

Modification

Although a case where the present invention is applied to an image forming apparatus that performs a printing operation by using metallic (metallic luster color) toner such as silver toner or gold toner has been described in the above exemplary embodiment, the present invention is not limited to this. The present invention can be applied to an image forming apparatus that performs a printing operation by using a color material other than toner as long as the printing operation is performed by using a glittering color material (e.g., pearl color material) whose color shade differs depending on a viewing direction.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a storage unit in which a plurality of colorimetric values obtained by measuring a target-color image having a glittering characteristic from a plurality of directions are stored for each target color;
   a color information receiving unit that receives color information for specifying a target color to be printed;
   a display controller that performs a control operation for reading out a plurality of colorimetric values stored corresponding to the target color of the color information received by the color information receiving unit from the storage unit and causing the plurality of colorimetric values to be displayed on a display;
   a change receiving unit that receives a change of the plurality of colorimetric values displayed on the display by the display controller; and
   a converter that converts the plurality of colorimetric values reflecting the change received by the change receiving unit into color values including a value indicative of an amount of a glittering color material and a value indicative of an amount of a color material other than the glittering color material.

2. The image processing apparatus according to claim 1, wherein
   the plurality of colorimetric values stored in the storage unit are values expressed by a color system including at least lightness information.

3. The image processing apparatus according to claim 2, wherein
   the color system is a color system expressed by a CIE L*a*b* color space.

4. The image processing apparatus according to claim 2, wherein
   the plurality of colorimetric values include, in a case where the target-color image is obliquely irradiated with light, a colorimetric value of the target-color image measured in a front direction normal to the target-color image and a colorimetric value of the target-color image measured in a specular direction that is a direction of specular reflection of the light.

5. The image processing apparatus according to claim 4, wherein
   the display controller performs a control operation for causing at least the colorimetric value measured in the front direction and lightness information of the colorimetric value measured in the specular direction to be displayed on the display.

6. The image processing apparatus according to claim 5, wherein
   the plurality of colorimetric values further include a colorimetric value of the target-color image measured in a diffusion light direction closer to a light incident direction than to the front direction.

7. The image processing apparatus according to claim 6, wherein
   the plurality of colorimetric values further include a colorimetric value of the target-color image measured in a direction closer to the specular direction than to the front direction.

8. The image processing apparatus according to claim 5, wherein
   the plurality of colorimetric values further include a colorimetric value of the target-color image measured in a direction closer to the specular direction than to the front direction.

9. The image processing apparatus according to claim 4, wherein
   the plurality of colorimetric values further include a colorimetric value of the target-color image measured in a diffusion light direction closer to a light incident direction than to the front direction.

10. The image processing apparatus according to claim 9, wherein
    the plurality of colorimetric values further include a colorimetric value of the target-color image measured in a direction closer to the specular direction than to the front direction.

11. The image processing apparatus according to claim 4, wherein
    the plurality of colorimetric values further include a colorimetric value of the target-color image measured in a direction closer to the specular direction than to the front direction.

12. The image processing apparatus according to claim 11, wherein
    the converter determines an amount of the glittering color material that minimizes a minimum value of the average of the color differences by sequentially calculating, for each of different amounts of the glittering color material, the average of the color differences obtained in a case where the amount of the color material other than the glittering color material is changed without changing the amount of the glittering color material and then determines a combination of amounts of the color materials that minimizes the average of the color differences by determining the amount of the color material other than the glittering color material obtained when the amount of the glittering color material is determined.

13. The image processing apparatus according to claim 1, further comprising a memory in which a color conversion model in which a combination of a colorimetric direction and amounts of color materials of respective colors and actually measured color values are associated is stored,
    wherein the converter determines a combination of amounts of the color materials that minimizes an average of color differences between the colorimetric values of the target-color image in colorimetric directions and color values in the colorimetric directions obtained from the color conversion model.

14. The image processing apparatus according to claim 1, wherein
    the glittering color material is toner of a metallic luster color.

15. An image forming apparatus comprising:
    a storage unit in which a plurality of colorimetric values obtained by measuring a target-color image having a glittering characteristic from a plurality of directions are stored for each target color;
    a color information receiving unit that receives color information for specifying a target color to be printed;
    a display controller that performs a control operation for reading out a plurality of colorimetric values stored corresponding to the target color of the color information received by the color information receiving unit from the storage unit and causing the plurality of colorimetric values to be displayed on a display;

a change receiving unit that receives a change of the plurality of colorimetric values displayed on the display by the display controller;

a converter that converts the plurality of colorimetric values reflecting the change received by the change receiving unit into color values including a value indicative of an amount of a glittering color material and a value indicative of an amount of a color material other than the glittering color material; and an output unit that outputs an image on a basis of the color values obtained by the conversion by the converter.

16. A non-transitory computer readable medium storing a program causing a computer to execute a process comprising:

(a) receiving color information for specifying a target color to be printed;

(b) performing a control operation for reading out a plurality of colorimetric values stored corresponding to the target color of the color information received in the (a) from a storage unit in which a plurality of colorimetric values obtained by measuring a target-color image having a glittering characteristic from a plurality of directions are stored for each target color and causing the plurality of colorimetric values to be displayed on a display;

(c) receiving a change of the plurality of colorimetric values displayed on the display in the (b); and (d) converting the plurality of colorimetric values reflecting the change received in the (c) into color values including a value indicative of an amount of a glittering color material and a value indicative of an amount of a color material other than the glittering color material.

* * * * *